US006205373B1

(12) United States Patent
Hart et al.

(10) Patent No.: US 6,205,373 B1
(45) Date of Patent: Mar. 20, 2001

(54) METHOD AND SYSTEM FOR TRACKING MANUALLY REPAIRED MAILPIECES OR THE LIKE

(75) Inventors: William G. Hart, Sandy Hook; Eugene Pritchard, Brookfield; Michael Shea, Litchfield, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/385,846

(22) Filed: Aug. 30, 1999

(51) Int. Cl.[7] .......... G06F 7/00

(52) U.S. Cl. .......... 700/222; 700/220

(58) Field of Search .......... 700/222, 220, 700/221, 213, 215

(56) References Cited

U.S. PATENT DOCUMENTS

| | | | | |
|---|---|---|---|---|
| 3,484,100 | | 12/1969 | Sather et al. | 270/58 |
| 4,194,685 | | 3/1980 | Hill et al. | 235/375 |
| 4,381,447 | | 4/1983 | Horvath et al. | 250/223 |
| 4,790,119 | | 12/1988 | McDaniels | 53/411 |
| 4,797,830 | | 1/1989 | Baggarly et al. | 364/464.03 |
| 4,800,505 | | 1/1989 | Axelrod et al. | 364/478 |
| 4,987,547 | | 1/1991 | Rabindran et al. | 364/478 |
| 5,067,088 | * | 11/1991 | Schneiderhan | 364/478 |
| 5,175,691 | * | 12/1992 | Baker et al. | 364/478 |
| 5,220,770 | | 6/1993 | Szewczyk et al. | 53/493 |
| 5,317,654 | | 5/1994 | Perry et al. | 382/61 |
| 5,467,434 | | 11/1995 | Hower, Jr. et al. | 395/114 |
| 5,493,106 | | 2/1996 | Hunter | 235/375 |
| 5,618,037 | * | 4/1997 | Chang et al. | 271/258.02 |
| 5,659,481 | | 8/1997 | Qutub et al. | 364/478.08 |
| 5,710,874 | | 1/1998 | Bergen | 395/115 |
| 5,730,299 | | 3/1998 | Helsley | 209/584 |
| 5,768,132 | | 6/1998 | Cordery et al. | 364/464.14 |
| 5,798,930 | | 8/1998 | van Oosten | 364/478.01 |
| 5,816,715 | | 10/1998 | Harman et al. | 400/71 |
| 5,818,724 | | 10/1998 | Brewster, Jr. et al. | 364/478.08 |
| 5,826,869 | | 10/1998 | Nyffenegger et al. | 270/52.02 |
| 5,936,865 | * | 8/1999 | Pintsov et al. | 364/478.14 |
| 5,974,147 | * | 10/1999 | Cordery et al. | 380/25 |
| 6,119,051 | * | 9/2000 | Anderson, Jr. et al. | 700/221 |

* cited by examiner

*Primary Examiner*—Christopher P. Ellis
*Assistant Examiner*—Khoi H. Tran
(74) *Attorney, Agent, or Firm*—Christopher J. Capelli; Michael E. Melton

(57) ABSTRACT

A method and system for tracking manually repaired mailpieces and the like. Control documents are produced by a data processing system and transported to an inserter system. The inserter system inputs the control documents and assembles mailpieces in accordance with mailpiece records identified by coded information on the documents. If a damaged mailpiece is manually repaired an operator scans the coded information from the damaged mailpiece. A data processing system accesses the mailpiece record in accordance with the scanned information and updates the corresponding mailpiece record to reflect manual repair of the document.

13 Claims, 4 Drawing Sheets

METHOD AND SYSTEM FOR TRACKING MANUALLY REPAIRED MAILPIECES OR THE LIKE

BACKGROUND OF THE INVENTION

This invention relates to the preparation of large mailings and the like. More particularly it relates to systems and apparatus for the preparation of documents and the assembly of multiple mailpieces including such documents, and tracking of mailpieces which are damaged and manually repaired in this process.

The term "mailpieces" as used herein means items intended to be delivered to an addressee by a postal service or in any other convenient manner. Typically preparation of mailpieces includes, but is not limited to, printing or otherwise providing documents including variable information pertaining to addressees of the mailpieces and the assembly of such documents with other elements of the mailpiece. The term "assembly" as used herein means the execution of actions to incorporate the documents into mailpieces. Typically, such actions can include: accumulating documents with other materials such as preprinted inserts, folding and inserting the resulting accumulations into envelopes, printing addresses and other information on the outside of the envelopes, and franking the mailpiece with an appropriate postage amount.

Inserter systems for the assembly of mailpieces are well known. A typical inserter system is shown in FIG. 1. Inserter system 10 includes burster/feeder 12 which inputs preprinted documents in fanfold form, separates the documents. Each group of documents for a particular mailpiece includes at least control document CD. At least control documents CD are marked with code BC which is read by scanner 14. In simpler systems code BC can be a "dash code" of the type known for use in directly controlling inserter systems. In newer, more complex systems code BC can be a conventional bar code which serves as a pointer to a mailpiece record, which record contains information for controlling the inserter; as will be more fully described below. In other known inserter systems, a cut sheet document feeder can be used in place of burster/feeder 12 and documents can be in cut sheet form.

Control document CD, and any additional associated pages P are fed from burster feeder 12 to accumulator 16 where documents for each mailpiece are formed into separate accumulations A and folded.

Accumulation A is then fed to insert stations 20A and 20B where preprinted inserts I are added to form accumulations A1 and A2. Those skilled in the art will of course recognize that the number of such insert stations used will vary from application to application.

Accumulation A2 is then fed to insert station 22 where it is inserted into an envelope and sealed to form mailpiece MP.

Mailpiece MP is then fed to address printer 24 which prints address AD on the outside of the envelope. Depending on the size of the print field of printer 24, printer 24 also can be used to print other information such as a variable return address (or other text message) RA, logo L, and postal barcode PBC on the envelope. (Those skilled in the art will recognize that dash codes as described above typically cannot include sufficient information to define even address AD so that systems incorporating dash codes typically use window envelopes to provide addressing information.)

System 10 also includes outstacker 30 for diverting mailpieces when an error is detected.

As noted above, inserter systems wherein said code BC is a barcode which is used as a pointer to a mailpiece record (i.e. an electronic record associated with a mailpiece to be assembled) are known. By incorporating data for controlling assembly of mailpieces in mailpiece records an essentially unlimited amount of data can be associated with each mailpiece. Thus addresses, return addresses, logos, and postal bar codes can all readily specified in addition to specification of the number of inserts to be added at each insert feeder, postage amounts, etc. Systems incorporating such mailpiece records are described in commonly assigned U.S. Pat. No. 4,800,505; to: Axelrod et al.; for: Mail Preparation System; issued Jan. 24, 1989. Embodiments of the system of U.S. Pat. No. 4,800,505 are marketed by the assignee of the present application under the name "Direct Connection", described in *The Direct Connection,* version 1.30.

A typical MRDF record which is associated with a mailpiece to be processed is shown in Table 1 below.

TABLE I

MRDF Record

| Start | Length | Description |
|---|---|---|
| 1-60 | 60 | Full Name |
| 61-120 | 60 | Address 1 |
| 121-180 | 60 | Address 2 |
| 181-240 | 60 | Address 3 |
| 241-300 | 60 | Street (Primary) |
| 301-328 | 28 | City |
| 329-344 | 15 | State |
| 345-349 | 5 | Zip 5 |
| 350-353 | 4 | Zip + 4 |
| 354-355 | 2 | Zip + 2 |
| 356-360 | 10 | Carrier Route |
| 361-362 | 2 | Presort Type (EC/CC/P/R) |
| 363-372 | 10 | Sequence # (Piece ID) |
| 373-379 | 7 | Job ID |
| 380 | 1 | Break 1 Flag (Y/N) |
| 381-382 | 2 | Outsort (Bin #) |
| 383 | 1 | Sealer (Y/N) |
| Total Length | 383 | |

In the record shown in Table 1, bytes 1–60 specify the addressee's name; bytes 61–240 specify 3 lines of additional addressee information such as additional addressees, titles, etc.; bytes 241–344 specify the address; bytes 345–355 specify the Zip Code with either a two or four digit extension; bytes 356–360 specify a carrier route; bytes 361–362 identify the type of presorting which has been carried out for the mailing; bytes 363–372 specify the mailpiece ID, which increases or decreases by one, monotonically for each mailpiece; bytes 373–379 specify the job or mailing in process, and with the mailpiece ID uniquely identify the mailpiece; byte 380 flags a break in the mailing; bytes 381–382 specify he intended disposition of the finished mailpiece, i.e. the destination outsort bin; and byte 383 specifies whether or not the mailpiece is to be sealed. (Though not shown in FIG. 1, sealers are conventional in inserter systems.)

Other information which can be included in MRDF records can be information such as messages or return addresses or specification of the number of inserts to be added at each insert station. In general the information and format of MRDF records is limited only by the system capabilities and provides substantially unlimited flexibility in controlling mailpiece processing. In particular, incorporation of information which uniquely identifies each mailpiece permits tracking of mailpieces which are damaged and manually repaired in the manner described below. (As used herein "manual repair" includes any off-line process involving operator intervention used to restore mailpieces which have been damaged to mailable condition.)

While systems such as those described above have proven highly successful, certain problems remain. In particular modem inserter systems operate at extremely high processing rates which require that documents, inserts and envelopes all be moved and handled at high speeds with the result that a small percentage of documents will be damaged, typically causing the system to jam. Since in many applications it is critical that mailings be complete (e.g. mailing of bills or invoices by suppliers), methods must be provided to repair or replace damaged mailpieces. Heretofore such methods have relied upon difficult and time consuming reprogramming of a data processing system to regenerate the documents for a misprocessed mailpiece so that the damaged mailpiece could be regenerated by the inserter system, or manual repair of damaged mailpieces.

Another solution to the problem of regenerating mailpieces wherein systems are programmed for automatic regeneration of damaged or misprocessed mailpieces is described in commonly assigned, co-pending U.S. application Ser. No. 09/134,977, titled: "Method and System for Regeneration of Misprocessed Mailpieces or the Like". filed: Aug. 17, 1998.

Since special reprogramming of systems to regenerate particular damaged mailpieces is difficult and expensive and not all systems include software for automatic regeneration as described in the above mentioned co-pending application, in many cases manual repair of damaged mailpieces remains the most effective solution to the problem of maintaining the integrity of mailings. While in general manual repair has proven to be effective it does create its own problems; particularly problems of misidentification of repaired mailpieces. Heretofore when an operator had repaired a mailpiece he or she would input the identification of the repaired mailpiece so that the system could continue to track it and maintain records which would evidence completeness of the mailing. Clearly this is a tedious and error prone process and too often an operator would misidentify a repaired mailpiece, compromising the systems ability to provide assurance that mailings were complete.

Thus it is an object of the subject invention to provide a system, apparatus and method for the preparation and assembly of mailpieces with an improved capability for tracking mailpieces which have been damaged in preparation and manually repaired.

BRIEF SUMMARY OF THE INVENTION

In accordance with the subject invention the above object is achieved and the disadvantages of the prior art are over come by means of a novel method and system for assembling mailpieces and assuring that mailpieces which are damaged by the system and manually repaired are accurately tracked, the system including: mail production equipment; a scanning system; and a control system. The control system controls the mail production equipment to assemble the mailpieces in accordance with information included in mailpiece records, each of the records corresponding to one of the mailpieces. In accordance with the method of the subject invention, a data processing system, which can be the control system, is responsive to information scanned from a damaged mailpiece to identify a particular one of the records corresponding to the damaged mailpiece in accordance with information scanned from the damaged mailpiece, and to access the identified record to update disposition information in the record to reflect manual repair of the damaged mailpiece.

In accordance with one aspect of the subject invention the mail production equipment comprises an inserter system.

In accordance with another aspect of the subject invention the scanned information is scanned from a bar code printed on the at least one document comprised in the damaged mailpiece.

In accordance with another aspect of the subject invention the scanned information comprises a pointer to the corresponding record for the damaged mailpiece.

Other objects and advantages of the subject invention will be apparent to those skilled in the art from consideration of the attached drawings and the detailed description set forth below.

DETAILED DESCRIPTION OF PREFERRED EMBODIMENTS OF THE SUBJECT INVENTION

Figure 2:
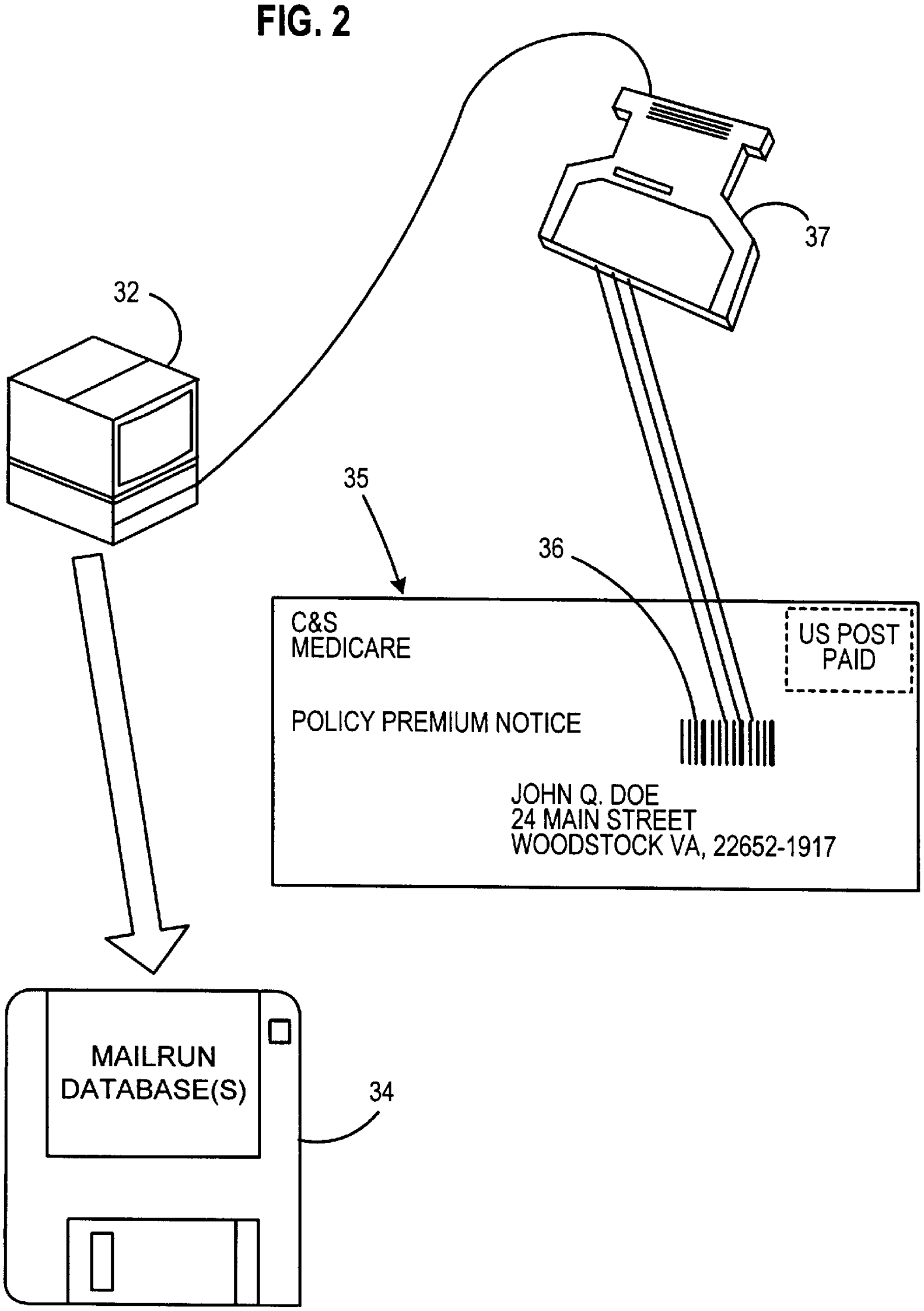
FIG. 2 shows a simplified schematic diagram of a system in accordance with the subject invention.

FIG. 2 shows a simplified schematic representation of a system in accordance with the subject invention. Data processing system 32, which can be a controller for a mail preparation system, communicates with database 34 (shown schematically as a portable data storage medium) of mail run data files which include mailpiece records for controlling a mail preparation system to produce corresponding mailpieces. If damaged mailpiece 35 is to be manually repaired pointer 36 is input to system 32 through scanner 37 in a conventional manner well known to those skilled in the art. System 32 accesses the corresponding record and updates any disposition or tracking data in the corresponding record to reflect manual repair of the mailpiece. (In the embodiment of FIG. 2 pointer 36 is shown the envelope of damaged mailpiece 35, however, as will be described further below, such pointers can be placed on any part, or parts, of the mailpiece, e.g. a bar code printed on the control document to control assembly of the mail piece.)

Figure 3:
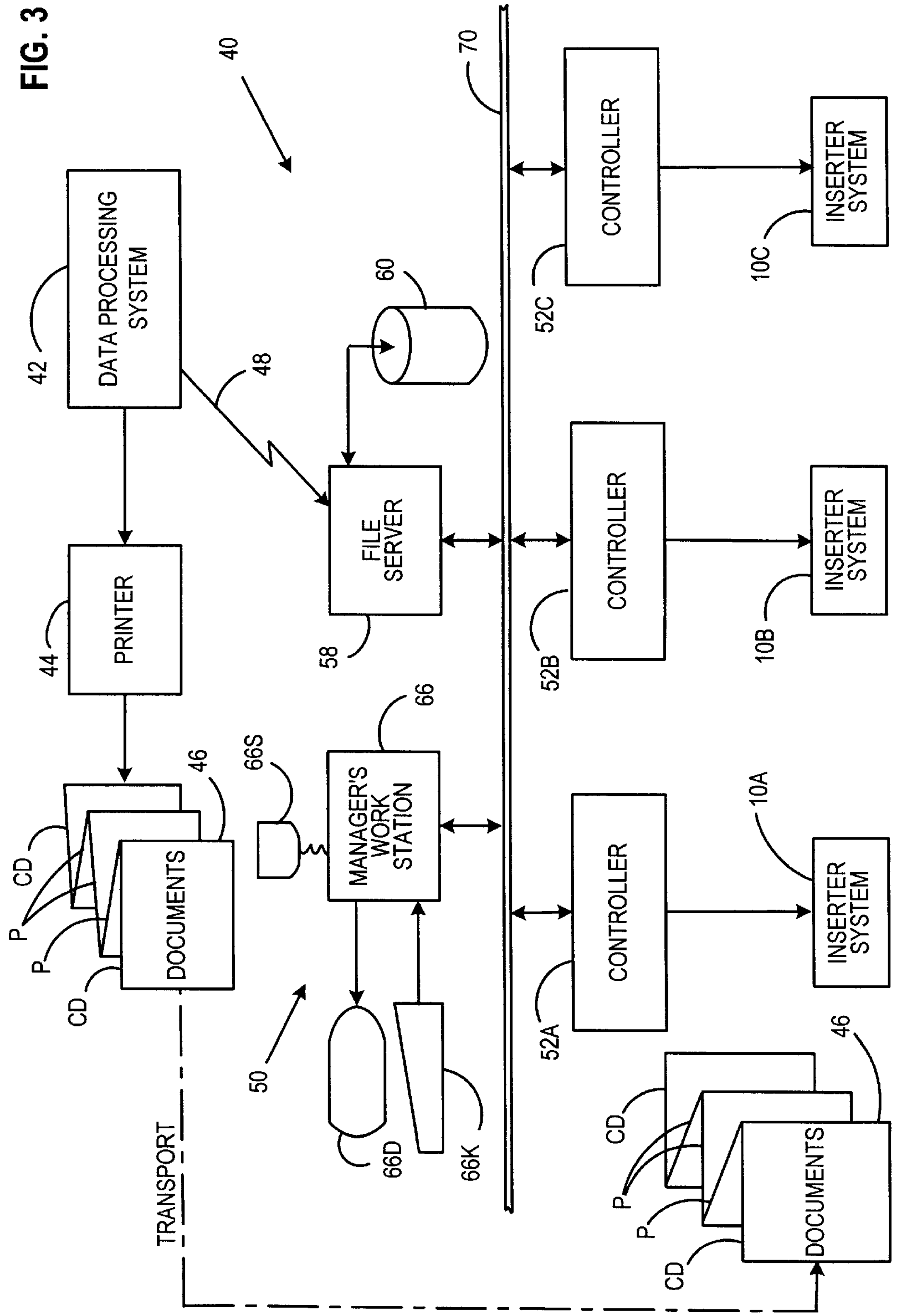
FIG. 3 shows a schematic block diagram of a system for preparing mailpieces and tracking repaired mailpieces.

FIG. 3 shows mail preparation system 40 which includes data processing system 42 and mailpiece assembly system 50.

Data processing system 42 is programmed in a conventional manner to generate documents 46, which include control documents CD and associated documents P; with one control document CD and its associated documents P being associated with each mailpiece, wherein control documents CD are marked with barcode pointers BC to mailpiece records in the manner described above. In the embodiment shown, system 42 controls printer 44 to print documents 46 directly, and documents 46 are transported physically for assembly; however, any convenient method of output and transport, such as electronic output and transmission for remote printing, can be used and is within the contemplation of the subject invention.

Data processing system 42 also generates and outputs a mailing control file, (hereinafter sometimes mail run data file, or MRDF) which includes a plurality of mailpiece records, in a conventional manner. The mailpiece records each include a plurality of fields containing data for controlling assembly of the mailpiece. The mailing control file is communicated to mailpiece assembly system 50 through communications link 48, which can utilize any convenient form of communication, such as electronic data communication or the physical transfer of media without departing from the scope the subject invention.

Figure 1:
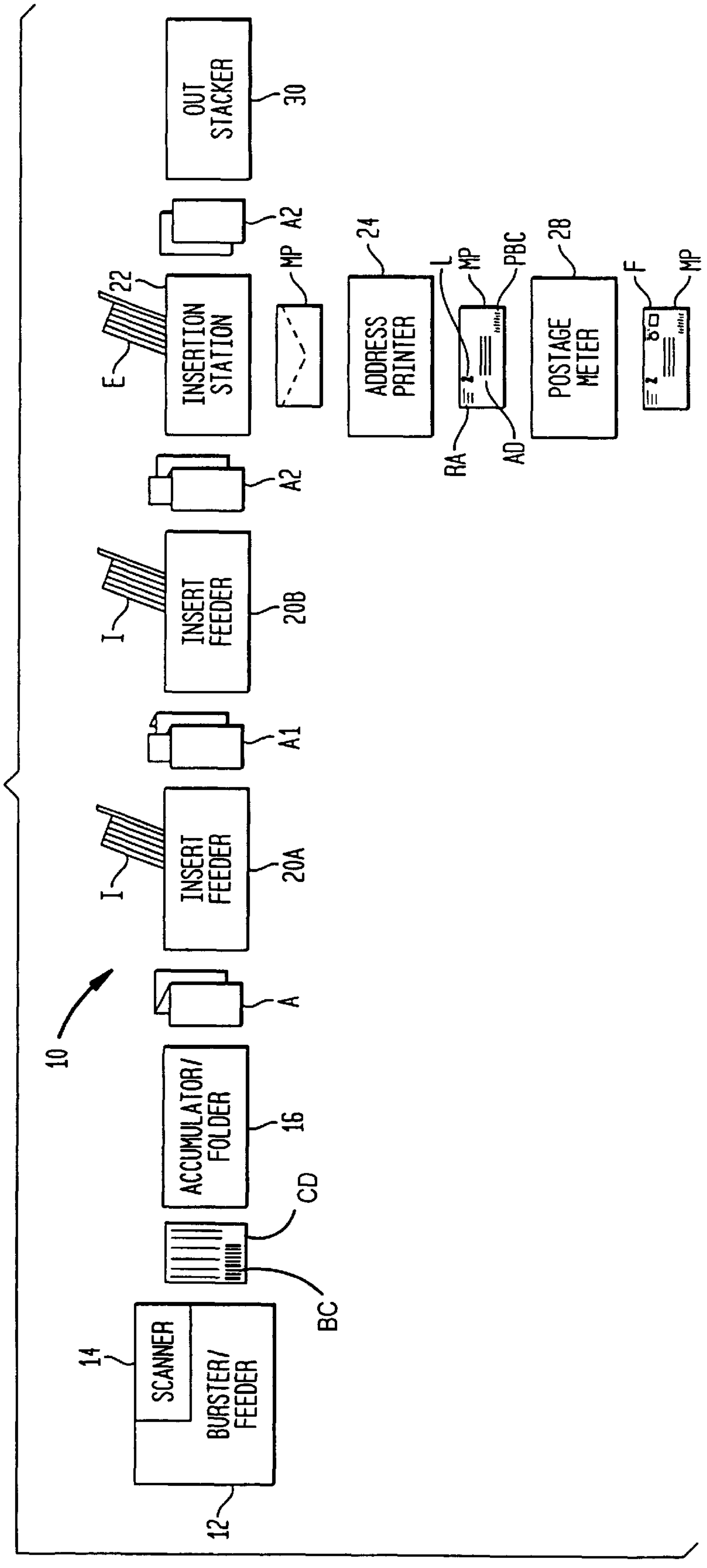
FIG. 1 (PRIOR ART)
FIG. 1 shows a schematic block diagram of a prior art inserter system.

In the embodiment shown in FIG. 3, mailpiece assembly system 50 includes inserter systems 10A, 10B, and 10C, which are substantially similar to conventional inserter system 10 described above with reference to FIG. 1, of the type wherein control documents CD include a barcode pointer to a mailpiece record. In accordance with the subject invention at least one document, preferably control document CD, uniquely identifies each mailpiece. In other embodiments of the subject invention different types of inserter systems having expanded (e.g. more insert modules) or different functions (e.g. matched mail generation or address verification) or other types of mail production equipment, such as systems for producing self-mailers or automated systems for assembling packages, can be used without departing from the scope of the subject invention.

Mailpiece assembly system 50 also includes controllers 52A, 52B, and 52C for controlling operation of inserter systems 10A, 10B, and 10C in a manner which will be described more fully below.

Mailpiece assembly system also includes file server 58 which manages MRDF data store 60 which stores mailing control files downloaded from data processing system 42, and which also communicates appropriate mailing control files to controllers 52A, B or C as mailings are assigned to inserter systems, as will be more fully described below. In general such data stores can be maintained on any device or system which is conveniently accessible without departing from the scope of the subject invention, and are preferably maintained on common network mapped drives accessible by controllers 52A, 52B, and 52C and workstation 66.)

Mailpiece assembly system also includes manager's workstation 66, which includes display 66D and keyboard 66K through which a site manager can access and edit data stores 60 and can assign mailings to various inserter systems. Workstation 66 also includes scanner 66S, which is preferably a conventional hand held bar code scanner but which can be any convenient type of scanner which is compatible with the format of the pointer to the mailpiece record; for example the pointer can be in alphanumeric form and the scanner can be an OCR scanner.

In the embodiment shown a scanner system comprises scanner 66S and workstation 66, which functions as the scanner controller. Scanner 66S communicates to update the MFDR through server 58. In other embodiments of the subject invention the scanner system, or additional scanner systems, can be located at any of the inserter systems, or at any convenient location; provided that the scanner system can communicate, directly or indirectly, to update the MRDF.

Communication among workstation 66, file server 58 and controllers 52A, B and C is preferably carried out over conventional local area network 70 in a manner well understood by those skilled in the art and which need not be discussed further for an understanding of the subject invention.

Normal operation of inserter systems in producing mail is well understood and not be discussed further for an understanding of the subject invention.

Figure 4:
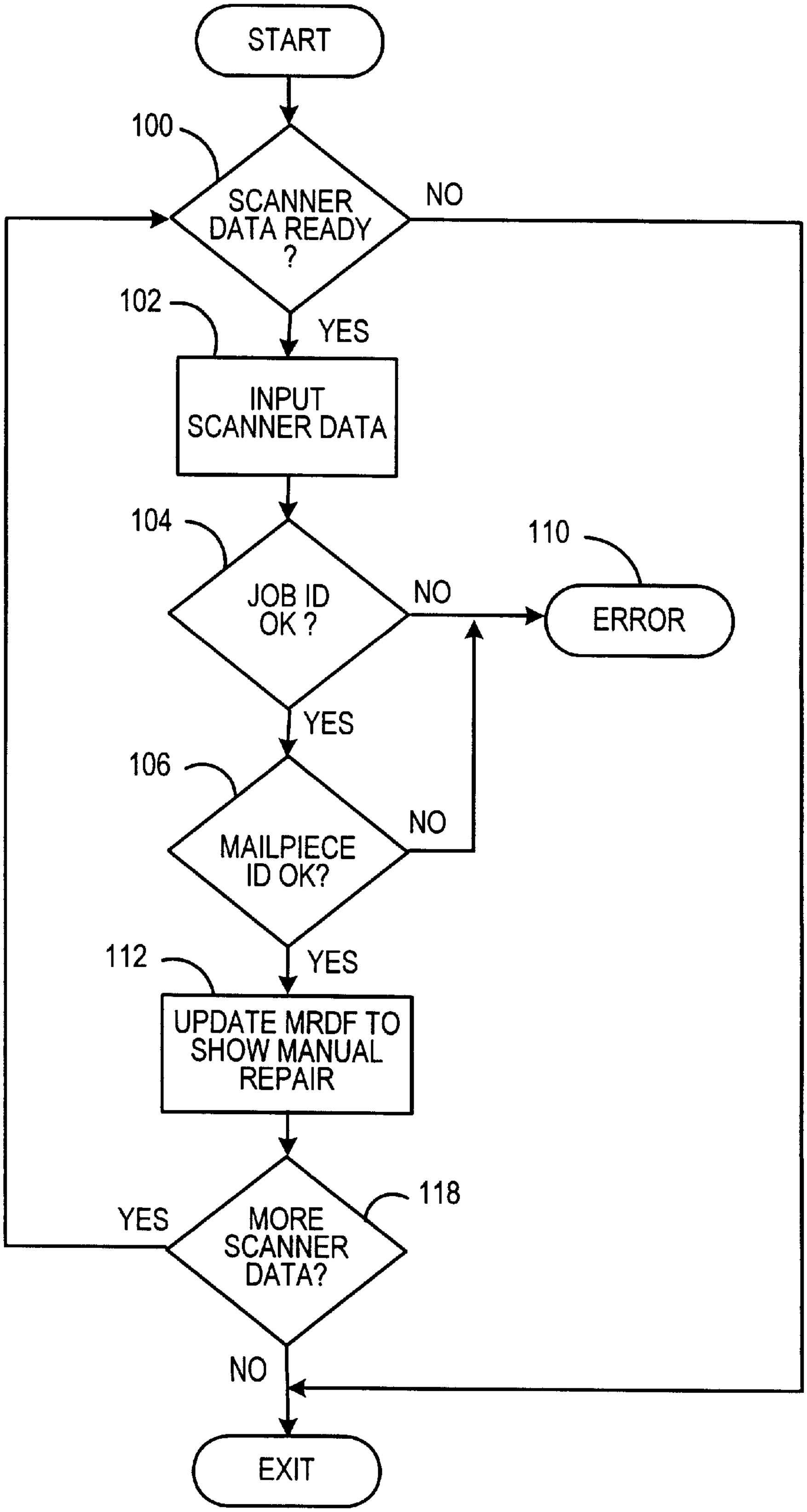
FIG. 4 shows a flow diagram of the operation of file server 58 in tracking of a manually repaired mail piece.

Turning to FIG. 4, a high level flow diagram of the operation of file server 58 in accordance with the method of the subject invention is shown. Execution of the program illustrated in FIG. 4 is initiated in any convenient manner such as in response to a schedule or to signal from workstation 66 indicating that data is available.

At 100 file server 58 tests to determine if scanned data is ready. If not server 58 exits and returns to normal operations. If a mailpiece has been damaged and retrieved by an operator the operator will scan barcode BC from the control document, or from any other document which includes the code, and information identifying the damaged mailpiece is decoded by workstation 66. Such scanning operations are conventional and not be discussed further for an understanding of the subject invention.

(Typically each document in a mailpiece is printed with a barcode showing the job ID, mailpiece ID and page number and any document in a mailpiece can be scanned to identify the corresponding mailpiece record. In some cases the barcode is printed only on the control document which is scanned to locate the corresponding mailpiece record to control assembly of the mailpiece. In some systems the barcode can be printed on sprocket feed strips on the documents. Since these feed strips are removed by the burster feeder provision must be made in these systems to provide a copy of the barcode or an equivalent pointer on at least one document in each mailpiece.)

Then at 102 server 58 inputs the scanner data and at 104 and 106 determines if the data represents a valid job and mailpiece; i.e. identifies a mailpiece record which is currently active in data store 60. If a valid job and mailpiece are not identified server 58 exits to an error routine which, for example can request re-scanning of the damaged mailpiece. In general details of such an error routine form no part of the subject invention.

At 112 server 58 locates the corresponding mailpiece record and updates it to show that the damaged mailpiece has been manually repaired. Preferably such updating includes overwriting the disposition information in the mailpiece record and any other tracking information which is included in the MRDF.

In the event that a damaged mailpiece is not repaired after it has been scanned, for example because it is found to be too badly damaged, the operator can enter a correction through keyboard 66K and workstation 66.

At 118 the server 58 tests to determine if there is more scanner data, i.e. if other damaged mailpieces have been repaired. If so the system returns to 100. Otherwise the system exits.

It will also be apparent to those skilled in the art that, while the subject invention is preferably intended for use in the preparation of large mailings, in other embodiments the subject invention can be used for other applications. For example, the subject invention can be used with other types of mail production equipment such as systems for producing self-mailers, i.e. printed sheets which can be folded and sealed to form a mailpiece without an envelope. In another embodiment the control document can be a freight bill used to control conventional automated "picking" systems to assemble small items or packages to form a package for delivery. Further, mail production equipment control system architectures, other than the client/server system described above (such as for example, direct control of inserter systems by a single data processing system which also maintains a file of mailpiece records) are also within the contemplation of the subject invention.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for tracking mailpieces which are damaged by mail production equipment and manually repaired, said method comprising the steps of:

a) scanning at least one sheet of a damaged mailpiece to input information identifying said damaged mailpiece to a data processing system communicating with a mail run data file for said mail production equipment; and b) controlling said data processing system to access a record corresponding to said damaged mailpiece in response said identifying information and to update said record to indicate that said damaged mailpiece has been manually repaired.

2. A method as described in claim 1 wherein said data processing system is a manager's work station, or is a mail production control system for controlling said mail production equipment to produce mailpieces in accordance with information in said mail run data file, and said identifying information comprises a pointer to said corresponding record for said damaged mailpiece.

3. A method as described in claim 2 wherein said mail production equipment comprises an inserter system.

4. A method as described in claim 2 wherein said input information is scanned from a code printed on said at least one document comprised in said damaged mailpiece.

5. A method as described in claim 1 wherein said mail production equipment comprises an inserter system.

6. A method as described in claim 1 wherein said input information is scanned from a code printed on said at least one document comprised in said damaged mailpiece.

7. A system for assembling mailpieces and tracking manually repaired mailpieces, comprising:

a) mail production equipment;

b) a scanning system;

c) a control system controlling said mail production equipment to assemble said mailpieces in accordance with information included in mailpiece records, each of said records corresponding to one of said mailpieces; and d) a data processing system responsive to information scanned from a damaged mailpiece to identify a particular one of said records corresponding to said damaged mailpiece in accordance with information scanned from said damaged mailpiece, and to access and update said identified record to indicate when said damaged mailpiece has been manually repaired.

8. A system as described in claim 7 wherein said data processing system is a manager's work station, or is a mail production control system for controlling said mail production equipment to produce mailpieces in accordance with information in said mail run data file, and said identifying information comprises a pointer to said corresponding record for said damaged mailpiece.

9. A system as described in claim 7 wherein said identifying information comprises a pointer to said corresponding record for said damaged mailpiece.

10. A system as described in claim 9 wherein said mail production equipment comprises an inserter system.

11. A system as described in claim 9 wherein said input information is scanned from a code printed on said at least one document comprised in said damaged mailpiece.

12. A system as described in claim 7 wherein said mail production equipment comprises an inserter system.

13. A system as described in claim 7 wherein said input information is scanned from a code printed on said at least one document comprised in said damaged mailpiece.

* * * * *